United States Patent [19]

Toivio et al.

[11] Patent Number: 4,522,166
[45] Date of Patent: Jun. 11, 1985

[54] DEVICE FOR THE IMPROVING OF THE STARTING OF AN ENGINE

[76] Inventors: Ilkka Toivio; Terttu Toivio, both of Likolammenkatu 15, 15850 Lahti 85, Finland

[21] Appl. No.: 558,423

[22] Filed: Dec. 6, 1983

[30] Foreign Application Priority Data

Dec. 7, 1982 [FI] Finland ............................... 823746
May 4, 1983 [WO] PCT Int'l Appl. .... PCT/FI83/00039
Aug. 18, 1983 [FI] Finland ............................... 832963

[51] Int. Cl.³ ............................................. F01M 1/00
[52] U.S. Cl. ........................... 123/196 A; 123/196 AB; 210/168; 210/774
[58] Field of Search ................... 123/196 A, 196 AB; 210/774, 790, 168

[56] References Cited

U.S. PATENT DOCUMENTS

| 2,088,243 | 7/1937 | Koinzan | 210/168 |
| 4,354,946 | 10/1982 | Warlick et al. | 123/196 A |
| 4,369,110 | 1/1983 | Picek | 123/196 A |
| 4,388,185 | 6/1983 | Ott et al. | 123/196 A |

FOREIGN PATENT DOCUMENTS

| 2115221 | 10/1972 | Fed. Rep. of Germany . | |
| 810803 | 9/1981 | Finland | 09001981/GBX |
| 55-54619 | 4/1980 | Japan . | |

1525471 9/1978 United Kingdom .

OTHER PUBLICATIONS

PCT, WO82/00419, Masso "Oil Refining Apparatus".

Primary Examiner—E. Rollins Cross
Attorney, Agent, or Firm—McGlew and Tuttle

[57] ABSTRACT

The object of the invention is a device for the improving of the starting of an internal combination engine especially during the cold seasons. The device (7) comprises a chamber (10) with the inlet and outlet conduits (121,111). In combination with the chamber (10) is installed a heating element (18, 19). The chamber (10) is connected directly with the main lubricating oil duct of the engine. Preferably the heating element forms at least a part of the flow guide (14), which is installed in a direction deviating from that of the inlet and/or outlet conduit (121,111). The device may be situated anywhere between the oil filter and/or the oil pump and the parts requiring lubrication in the engine provided that there is a direct and short connection from the device to the lubricating oil ducts of the engine. On the other hand, a fixed device according to the invention may be arranged into the main lubricating oil duct of the engine or into other ducts corresponding to said duct leading to important parts requiring lubrication in the engine.

7 Claims, 7 Drawing Figures

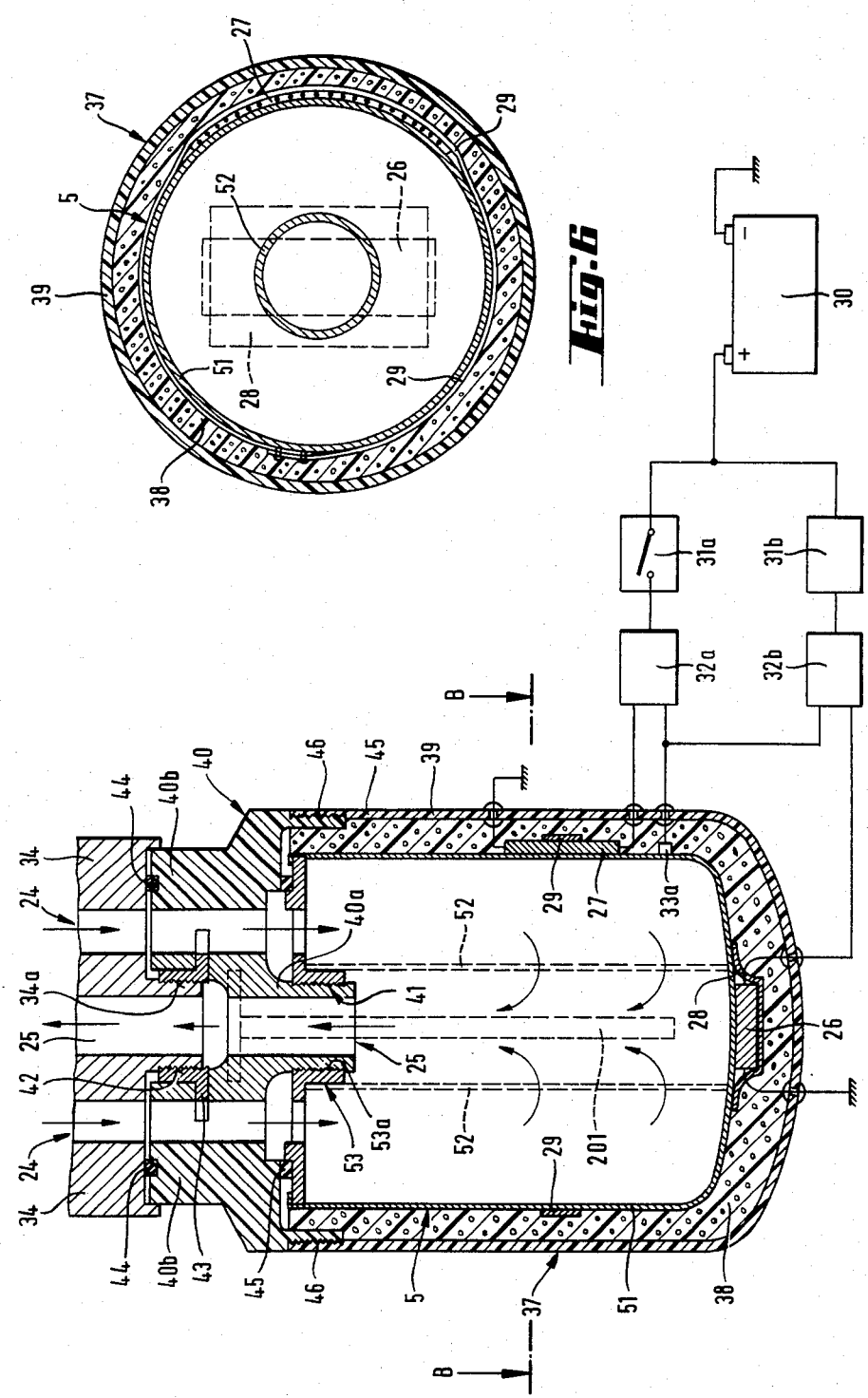

DEVICE FOR THE IMPROVING OF THE STARTING OF AN ENGINE

FIELD AND BACKGROUND OF THE INVENTION

The object of the invention is a device for the improving of the starting of an engine especially during the cold seasons.

The successful starting of an automobile or another such vehicle or heavy duty machine is difficult, during the cold season, particularly after several hours of parking. Especially the starting of an automobile which has been parked outside, over night, in low sub-zero temperatures, is not often successful, because the resistance to revolution in the engine is great due to the stiffness of the lubricating oil, and the reduced battery charge due to the cold. Thus the current available for the starting motor is lowered. Therefore, the chances of the starting of diesel-, petrol- or other corresponding engines is reduced. In addition, cold starting wears the engine and shortens its life.

The German Application Publication DE-OS No. 1 805 862 introduces a thermal battery system, in which there is a heat insulated container arranged in combination with either the oil lubrication or the cooling water system of the engine. Hot lubricating oil, or respectively, cooling water, is stored in the container during the parking-time, and during the starting, it is appropriately transferred with a pump to the corresponding areas of the engine. The container may also be filled with some appropriate heat retaining material, through which the lubricating oil or, respectively, the cooling water, is circulated. In such a case, the oil/water is pumped through the thermal battery when starting the engine, and thus is heated up.

One disadvantage in the thermal battery system described above is that it requires a separate, insulated oil/water container, relatively large in volume, which has to be fitted into the cooling or lubricating oil system of the engine. Such a container must be mounted as close to the engine as possible in order to reduce the loss of heat, and that is cumbersome in old engines due to the lack of space. In addition, the thermal battery system requires additional parts such as for example an additional pump, valves and connecting wires, which increase the expenses.

The German Patent Publication DE-PS No. 1 158 756 introduces a lube economizer which is arranged to operate in combination with the oil pan of an internal combustion engine. There is a conductor coil fitted above the surface of the oil in the oil pan, piercing the wall of it, through which coil a heat-providing fluid is lead. The conductor coil is connected, with a copper cylinder or another heat-conducting organ, to the actual layer of oil on the bottom of the oil pan and to for example a strainer, pump or wires heated therein.

One disadvantage in the lube economizer described above is that the device requires a space in the oil pan and that it can only be installed in new engines. The punctures for the conductor coil in the walls of the oil pan result in sealing problems. In addition, the heat-providing fluid must be acquired from an external source before the starting of the engine. It must be noticed that insulating materials are missing, in which case the heat leakage between the device and the oil pan is of considerable magnitude, and that the ultimate object of the preheating is the total amount of oil in the oil pan.

The German Application Publication DE-OS No. 2 115 221 a device for the improving of the cold starting of an internal combustion engine, in which an electrical resistor is mounted either inside or outside of the oil pan, with which resistor the heating of the engine's lubricating oil in the oil pan is done. The greatest disadvantage in this device is that it requires great amounts of energy especially in low sub-zero temperatures, because the total amount of lubricating oil is intended to be heated or to be kept heated. Thus the electrical resistor has to be connected to a normal electrial network.

The German Application Publication DE-OS No. 2 713 153 has earlier introduced a lube economizer for an internal combustion engine, in which the electrical resistor element is in a strainer situated in the oil pan, through which strainer the lubricating oil is sucked by a pump through the actual oil filter into the engine. Of the disadvantages it can be mentioned that the surface temperature of a single resistor, immersed in the lubricating oil in the oil pan, cannot be raised very high due to the inflammability of the oil. Thus, the effective preheating of the lubricating oil with this device is not possible. In addition, the lubricating oil circulates through the oil pump and filter during the starting and gives up heat into these devices, cooling it before reaching the oil ducts of the engine.

SUMMARY OF THE INVENTION

One object of the invention is the elimination of the disadvantages mentioned above and the providing of a reliable but simple device which considerably improves the starting of an internal combustion engine in cold weather, even arctic circumstances. This is achieved with those distinctive features of the invention which are introduced in the patent claims.

In a device according to the invention, the heating element such as the electrical resistor with which the lubricating oil is heated, is installed in a space or a chamber which is in direct connection with the oil ducts, such as the main oil duct, leading to the parts requiring lubrication in the engine. The heating element can be housed in a separate device which has been installed in between the oil filter and the main oil duct or in a space which has been arranged directly into the main oil duct. A third advantageous embodiment is that the heating element is in combination with the oil filter. The electrical resistor can, in this case, be installed inside the oil filter or onto its shell, and it can be insulated from its surroundings, when necessary, by for example fixing around the oil filter and the heating element and preferably installing an intermediate piece between the oil filter and the oil ducts of the engine, which piece conducts heat poorly.

The following are the advantages of the invention. During the starting, which takes at the most 10–15 seconds, because the amount of oil needed for the lubrication of the engine is a relatively small part of the total amount of oil in the lubrication system. Thus the amount of a couple of desiliters of warm lubricating oil contained by an oil filter equipped with a heating element according to the invention, or a separate device equipped with a heating element and an oil filter or another corresponding device in direct connection with the oil duct of the engine, and which said amount is pumped directly through the main oil duct into the oil ducts of the engine, this said amount has a decisive effect upon the success of the starting. Then the reaching of the critical starting revolution speed of the engine with diesel engines also is probable.

In cold starting tests in which a device according to the invention has been used, it has been demonstrated that the figure describing the resistance to revolution in the engine (starting current×battery voltage/revolution speed) has decreased at least 10-30% compared to a regular cold starting.

Equipping the oil filter according to one embodyment of the invention with at least one electrical resistor and heat insulation and thus turning it into a thermal battery is, when put into practice, function-proof, simple and economical. The need for additional parts to the normal pressurised circulation lubrication system is minimal; valves, additional pumps or wirings are not needed. The unified exchangeable part comprising the electrical resistor and heat insulating is easy to fix around the normal oil filter in a new automobile as well as in an old one.

In order to guarantee a reliable starting, the oil filter normally belonging to the engine can be exchanged for a filter with a bigger oil chamber, and this can be equipped according to the above-mentioned embodyment of the invention, with one or more electrical resistors and heat insulation. This measure may be necessary for large heavy duty machines equipped with diesel engines.

The amount of oil to be heated or to be kept heated in the oil filter, in the separate device in connection with it and/or in the chamber fitted into the oil duct, is relatively small in volume. The necessary heating power and therefore the electrical resistor are thus reasonable in magnitude. The electrical resistor can be connected to the battery of the engine, and it will not load the battery too heavily. Thus the automobile or the heay duty machine will not be dependent on an external source for heating power.

BRIEF DESCRIPTION OF THE DRAWING

The invention is described in the following with the aid of the pictures appended in which:

FIG. 5 shows diagrammatically as a partial longitudinal view an oil filter which has according to another embodyment of the invention been equipped with an electrical resistor and heat insulation;

FIG. 6 shows a cross sectional view B—B of an oil filter according to FIG. 5.

DETAILED DESCRIPTION

Figure 1:
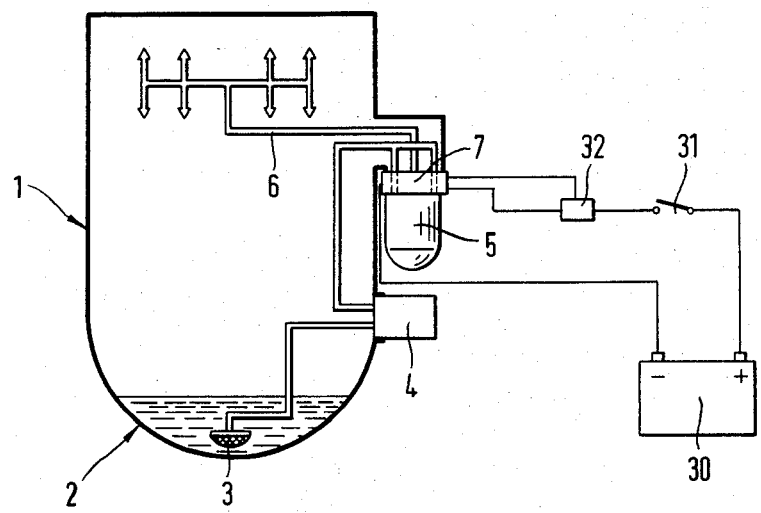
FIG. 1 shows diagrammatically the cross sectional view of the pressurized circulation lubrication system of an internal combustion engine, and an oil filter belonging to it and having been connected into the lubrication system of the engine with a device according to one embodyment of the invention.

As well known, pressurized circulation lubrication is nowadays commonly used in four-stroke engines. This is usually arranged in such a way that the so called oil pan 2, at the bottom of the crank case 1, functions as an oil tank or reservoir from which the oil is sucked through a strainer 3 into the oil pump 4. After this the oil is forced through an oil filter 5 into the main oil duct 6, from where it passes along various oil ducts to lubricate the moving parts of the engine, such as the crank shaft, camshaft and valve gear. The various oil ducts in the engine are shown only referentially in FIG. 1, because their structure as such is not of any essence as far as the invention is concerned. The lubrication system of a diesel engine is, in principal, alike the one mentioned device.

Figure 2:
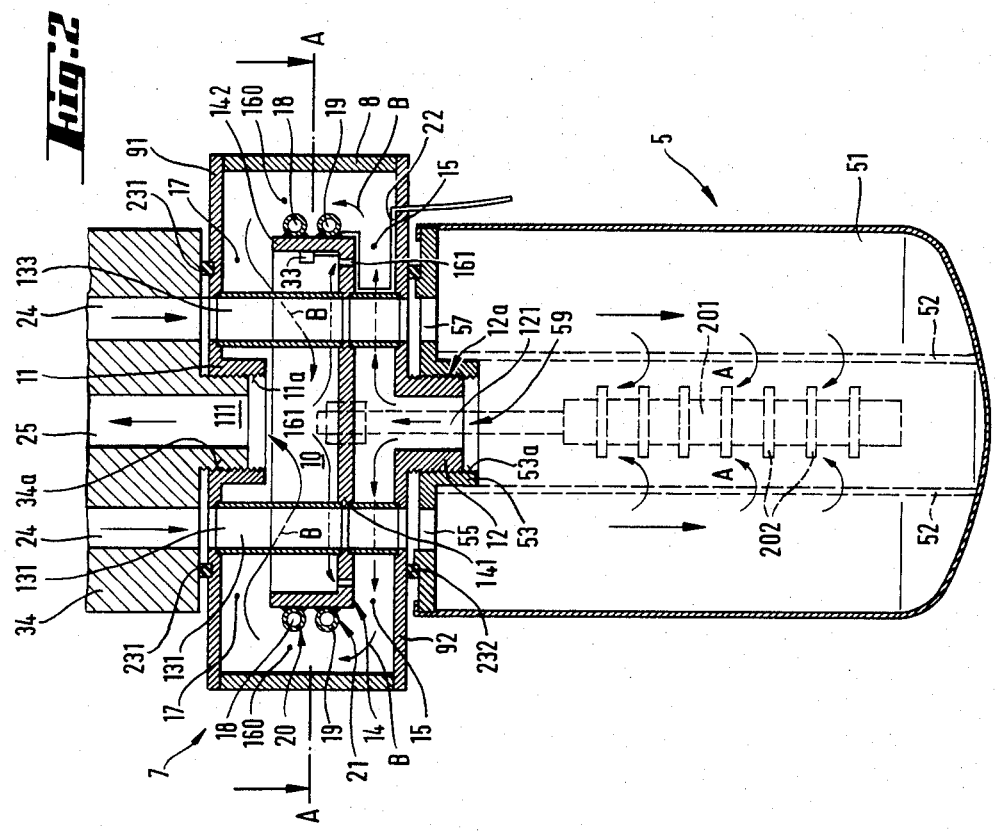
FIG. 2 shows the oil filter and device in FIG. 1.

Referring to FIG. 1 the oil filter 5 has been mounted with the device 7 onto the wall of the crank case 1. The device 7 is equipped with a least one heating resistor which is connected through the switch 31 and/or the thermostate 32 to the source of current 30, for example a battery. The sensor 33 of the thermostate is most advantageously set into the chamber 10 of the device 7 as shown in FIG. 2. The maximum temperature can be selected, and the thermostate controls that it is not exceeded.

The oil filter 5 is in a known way cylindrically symmetrical by its structure and such that the inlets 55, 56, 57 and 58 of the oil filter are oriented such that they are located in a circular area around the outlet 59, the orifices corresponding to the location of the inlet conduit 24 and the outlet conduit 25 in the connecting pipes or ducts 34 of the engine. Inside the shell 51 of the oil filter there is a cylindrical filter cartridge 52, through which the lubricating oil flows, while the engine is running, in the manner shown by arrows A in FIG. 2.

The device 7 comprises a chamber 10 which is advantageously formed between a cylindrical jacket 8 and the flanges 91 and 92 belonging to it. In the center of the flanges 91, 92 there are tubular connectors 11, 12, of which the first is directed inwards from the flange 91, parallel with the jacket 8, and the second outwards, respectively. The inner surface of the first connector 11 has female threads 11a, which match the male threads 3a, meant for the closed ended oil filter 5, in the connecting pipes 34 of the engine lubrication circuit. Respectively, there are male threads 12a on the outer surface of the second connector 12 which match the female threads 53a on the inner surface of the connector 53 of the oil filter 5. The inlet and outlet conduits 121, 111 pass through the connectors 12, 11. The oil is taken through these conduits into the chamber 10 of the device 7 and out. The flange 91 of the device 7 is, in addition, equipped with a rubber gasket ring 231 on the side of the connecting pipes 34, as also the oil filter 5 is equipped with a gasket ring 232. The device 7 is equipped with conduits 131, 132, 133, and 134, which go straight, parallel with the jacket 8, through the chamber 10 in the device 7. The conduits 131, 132, 133 and 134 are oriented such that they are located on a circular area on such a distance from the connectors 11, 12 which corresponds to the location of the oil inlet conduits 24 and the inlets 55, 56, 57 and 58 in the oil filter 5 in the adjoining area of the filter in question. The oil is forced through the conduits 131, 132, 133 and 134 directly from the oil pan through the agency of the oil pump 4 into the oil filter 5.

In the chamber 10 inside the jacket 8 of the device 7 there is housed a flow guide 14, which is installed in a direction deviating from that of the inlet and/or outlet conduit 121, 111. In this case it comprises a disc-shaped or baffle plate 141, set perpendicularly in relation to the conduits, and a rim 142 belonging to it. The rim 142 is advantageously parallel with the jacket 8, and between it and the jacket 8 there is formed an annular duct 160. Between the plate 141 and second flange 92 there is formed the first intermediate duct 15, and, respectively, between the center 141 and the first flange 91, there is formed the second intermediate duct 17, through which intermediate ducts the conduits 131, 132, 133 and 134 pass parallel with the jacket 8. The flowthrough channel of the oil thus comprises the intermediate ducts 15 and 17 and the annular duct 160. There are small orifices 161 pierced through the peripheral area of the center 141, close to the rim 142, through which a part of the oil also can flow.

The two electrical resistors 18, 19 are installed in contact with the flow guide 14. The resistors are housed inside the tubular parts 20, 21, which are fitted on the surface of the rim 142 and circle around parts 142, which parts 20, 21 function as the primary cooling elements for the resistors and, on the other hand, as the heating elements for the oil. The resistors 18, 19 are in direct contact with the corresponding parts 20, 21 in such a way that the conducting of heat from the resistors to the parts and further at least to the rim 142 of the flow guide 14 is achieved as effectively as possible. For this purpose, it is most advantageous to make the tubular parts 20, 21 as well as the rim 142 of the flow guide 14 of steel or another corresponding relatively highly heat conductive metal, and attach them to each other by welding, brazing or another such commonly known method. The disc-shaped plate 141 can also function, either entirely or partly, as a part of the element cooling the resistors and heating the oil.

The resistors 18, 19 are connected either in series or in parallel and connected by conductors through the conductor channel 22 to the source of current 30 as already explained in connection with FIG. 1.

A device according to the invention functions as follows. The heating resistors 18, 19 of the device are connected to the source of current 30 with the switch 32 either manually or with an appropriate timing device. In the chamber 10 of the device 7 there is always a small amount, for example 2 desiliters, of oil, which starts to heat up as an electrical current passes through the resistors 18, 19. After an appropriate time of waiting, for example 5–10 minutes, the temperature of the lubricating oil has risen sufficiently high, for example to 40° . . . 50° C., and the engine can be started. The thermostate 32 controls that the temperature of the oil does not exceed a desired level, for example 90° C., even if the waiting time were longer than estimated. This is especially important when the heating resistors 18, 19 are connected to the source of current 30 with the timing device after a desired period of time. On the other hand, a signal light among the measuring instruments in the switchboard of the vehicle can make known when the desired temperature has been reached and the starting can be done.

The warm oil contained by the device 7 rushes, as soon as the engine is started, through the first intermediate duct 15, mainly through the annular duct 160, and, to a small degree, through the orifices 161, and further through the second intermediate duct 17 in the manner shown by the arrows B in FIG. 2, into the oulet conduit 25 and directly into the main oil duct 6 of the engine or into a corresponding oil duct. The cold engine is thus immediately bathed in warm oil during its first revolutions; the resistance to revolution in the engine is essentially reduced, and the starting assured.

Figure 3:
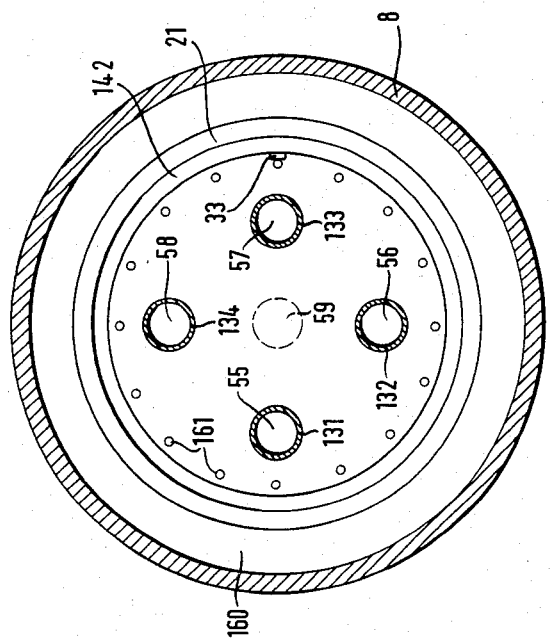
FIG. 3 shows the cross sectional view A—A of the device in FIG. 2.

The time required for the heating of the oil depends, other than on the amount of oil, on the size of the resistor, on the construction of the cooling element for the resistors and on the construction of the flow guide, and especially on the extent of the efficient, i.e. heat conductive surface on the cooling element for the resistors, on the heat transfer between it and the resistor, and on the desired end temperature. Supposing that the amount of oil contained by the device to be heated is 1 . . . 2 desiliters and the construction of the flow guide is like the one shown above (FIGS. 2 and 3) and it functions entirely as a cooling device for the resistors 18, 19, then a resistor of 75 W will raise the temperature of the oil in the heating time of 5–10 minutes, to the temperature of 35°–40° C. The battery discharge during this time will be in the range of 0.5 Ah. This equals under 2% of the energy in a half-discharged battery, if the battery in question is a normal passanger automobile battery, i.e. a 60 Ah one. Such a small strain before starting in sub-zero conditions, as well known, even raises the ability of the battery to do well in the actual starting.

In the embodyment of the device according to the invention shown above there is introduced one possibility for the carrying out of the flow guide 14 and the resistor elements belonging to it. The object is, above all, to make the oil in the chamber 10 of the device 7 to be in contact with as large a surface as possible of the flow guide or the cooler element which forms an essential part of it, because it is with this that the heat produced by the resistors is ultimately conducted to the oil and the rising of the surface temperature of the element above the inflammation point of the oil prevented. It is economically most advantageous to construct the flow guide with its resistors as simple as possible. It can comprise a round or disc-shaped steel plate, onto the surface of which and onto the outer rim of which there are installed resistors on one or both sides. The flow guide can be made of any well heat conductive material. It can, when necessary, be sealed from the straight conduits 131, 132, 133 and 134 delivering into the oil filter.

According to one embodyment of the invention the heating element formed by the straight tubular part 201 in which the resistors are housed, can be attached perpendicularly onto the flow guide 14 in such a way that it reaches through the outlet 59 into the inside of the oil filter 5 into the center of the filter cartridge 52. This is shown with a broke line is FIG. 2. Such an arrangement can be carried out either together with resistors set along the edge of the flow guide or in such a manner that there are no resistors attached onto the flow guide. The tubular part 201 can be equipped with cooling flanges 202.

It must be noticed that the flow of oil through the device 7 can be arranged in one direction only. Thus, for example, if the device is mounted in combination with the oil pump, the lubricating oil can be sucked through a separate passage into the oil pump and transferred through the device 7, equipped with the flow guide and resistors, directly into the main lubrication duct of the engine. In such a case, the device functions in the same manner as in the example of the application of the invention shown in FIG. 4, which will be referred to next.

Figure 4:
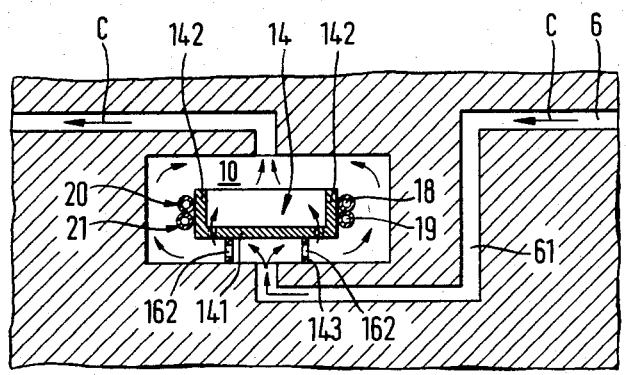
FIG. 4 shows a fixed device according to the invention which has been set in the main oil duct of the engine.

FIG. 4 shows diagrammatically how a device according to the invention can be built advantageously and fitted in as a fixed part of a new engine. The reference points in this figure are, as far as the device is concerned, mainly the same as in FIG. 2. The main oil duct 6 is arranged to take a downwards bend 61, and the chamber 10 is arranged into it. There are two electrical resistors 18, 19 fitted inside the chamber 10 with their cooling elements, the tubular parts 20, 21 functioning as such, and, advantageously, also the rim 142 of the flow guide 14. The flow guide 14 has been set into the chamber 10 on a support such as the sleeve 143. The walls of the sleeve are appropriately equipped with orifices 162 so that the oil can flow in direction C through the chamber 10.

The device in FIG. 4 functions in the way already explained in connection with FIG. 2. The fitting of the device 7 into the bend 61 fitted into the main oil duct 6 assures that the device is always full of oil after the engine has been turned off. The volume of the chamber 10 can thus be optimized according to the initial need of lubrication for the engine, most advantageously in the range of 1-3 desiliters.

The devices according to the invention described above can also be combined with some other device belonging to the lubrication circuit of the engine, such as for example the oil pump. The device can, in principle, be situated anywhere between the oil filter and/or the oil pump and the parts requiring lubrication in the engine. The precondition is that there is a direct and short connection from the device to the lubricating oil ducts of the engine. On the other hand, a fixed device according to the invention can be arranged into other ducts leading to important parts requiring lubrication in the engine, thus corresponding to the main oil duct, such as for example the oil duct delivering to the bearings of a turbo compressor. It is also advantageous to utilize a widening possibly already existing in the oil duct as the oil chamber 10 of the device.

FIG. 5 shows another embodiment of the device according to the invention, in which the oil filter is equipped with at least one electrical resistor and heat insulation. The oil filter 5 is, by its construction, cylindrically symmetrical in a known way as in FIG. 2.

According to FIG. 5, there are two electrical resistors 26, 27 installed in contact with the oil filter 5 on its shell in such a way that the heating produced in them is transmitted as effectively as possible into the filter 5 itself and from there into the oil contained by it. The electrical resistors 26, 27 can be fastened onto the shell of the filter with for example metal hoops 29 or metal strips 28. There is an insulation 37 placed around the oil filter 5 and the electrical resistors 26, 27.

The insulation 37 comprises a dome-shaped 10-15 millimeter layer of urethane 38, covered by a 2-4 millimeter hard-surface layer for shock-proofing, for example of polypropylethene. The insulation 38 may be permanently fixed around the oil filter 5, or it may be possible to change it and install it around the new filter during a filter change.

The electriacal resistors 26, 27 are installed inside the dome-shaped insulation 37 against the shell 51 of the oil filter. Between the connector 53 of the oil filter and the connecting pipes 34 of the lubrication circuit there is fitted an intermediate piece 40 which is made of such material as plastic that conducts heat poorly. It thus prevents the appearing of heat leakages between the filter 5 and the connecting pipes 34. At the same time, the intermediate piece functions as the support for the insulation 37.

The intermediate piece 40 is equipped with an annular duct corresponding to the oil inlet conduit 24 and with a tubular duct corresponding to the oil outlet conduit 25, situated in the middle of the annular one and isolated from it. The part 40a on the filter side of the intermediate piece 40 is equipped with male threads 41 which match the female fastening threads 53a of the connector 53 of the oil filter, and the part 40b on the side of the connecting pipes 34 of the intermediate piece is equipped with female threads 42, which match, correspondingly, the malefastening threads 34a meant for the filter in the connecting pipes 34 of the lubrication circuit. The female threads 42 in the intermediate piece are arranged in a metal piece 43 which is cast inside a plastic intermediate piece. The intermediate piece 40 is, in addition, equipped with a rubber gasket ring 44, 45 on the sides of both the oil filter and the connecting pipes.

The dome-shaped insulation 37 and the intermediate piece 40 can be made into either a fixed unit or a detachable one. In FIG. 5 there is shown the latter alternative, the insulation 37 is fastened with threads 46 onto the intermediate piece 40.

Intermediate pieces between the oil filter and the lubrication circuit of the engine, such as described above, can be used as fitting members for for example the fitting of a filter bigger than normal into the lubrication circuit. The one end of the intermediate piece, onto which the filter is to be attached, may for example be larger in diameter than previously used; and threaded in such a way that some other oil filter which is fit for the purpose and commercially available, can be attached to it. Thus for example in engines of considerable size and heavy duty machines the regular oil filter may be replaced by an oil filter which is, in relation, 1.5-4 times larger in volume, and it can be equipped with heat insulation. This alternative assures the sufficiency of hot lubricating oil and the success of the cold starting.

In the example of function according to FIG. 5, the size of the first resistor 26 is determined in such a way that the heat energy given by it is in the same range as the heat leakage in the insulation 37. Thus the heat energy given by the resistor suffices to retain the temperature of the filter and the oil in it on a level at least 20°-30° C. higher than that of the surroundings. The size of the second of the resistor 27 can be determined in such a way that the temperature of the oil contained by the oil filter 5 can be brought up to a certain temperature in a desired amount of time. Because the amount of oil in the filter 5 is, generally, in the range of 2-6 desiliters and the heat leakage minimal especially with the arrangements shown above, the resistors 26, 27 each have their output in the range of 5-20 W, in which case they can be connected to the source of current, i.e. the battery 30, of an automobile or duty machine, without straining the battery too much.

The electrical resistors 26, 27 or one of them are connected to the source of current 30 either directly with the switch 31a or with the thermostate 32a, 32b. The sensor 33a of the thermostate is mounted either on the inside of the oil filter 5 or onto its shell as shown in FIG. 5. The desired maximum temperature can be selected and the thermostate controls that it is not exceeded. In addition, the switch 31b, controlled by a timing device, can be used, in which case for example the heating can be started at the desired moment before the starting of the engine.

A device according to FIG. 5 operates as follows. When the automobile is left, on a cold evening, standing by the curb for the night, the first resistor 26 is connected with the switch 31a to the battery, and the second resistor 27 is set with the clock-controlled switch 31b to connect to the battery for example 3 hours before the starting in the morning. Thus the temperature of the oil in the oil filter remains, by the agency of the first resistor, almost constant into the small hours of the morning, when the second resistor switches on. The lubricating oil in the oil filter 5 now heats, during a period of a few hours, up to a certain temperature, for example 90° C. The thermostate 32a, 32b assures that the desired temperature is not exeeded. When the engine is started after the period of parking, the lubricating oil is taken directly from the oil filter 5 by the agency of the main oil duct of the engine to the sleeve bearing, and the resistance to revolution in the engine is considerably reduced.

The electrical resistor or resistors can also be made to form a tubular heating element 201 housed inside the oil filter, most advantageously in the center of it, for example in the center of the filter cartridge, and be fixed in the center of the orifices in the intermediate piece, as shown with the broken line in FIG. 5. Another possibility is to mount the heating element 201 in the oil filter 5, for example, according to FIG. 6.

Figure 7:
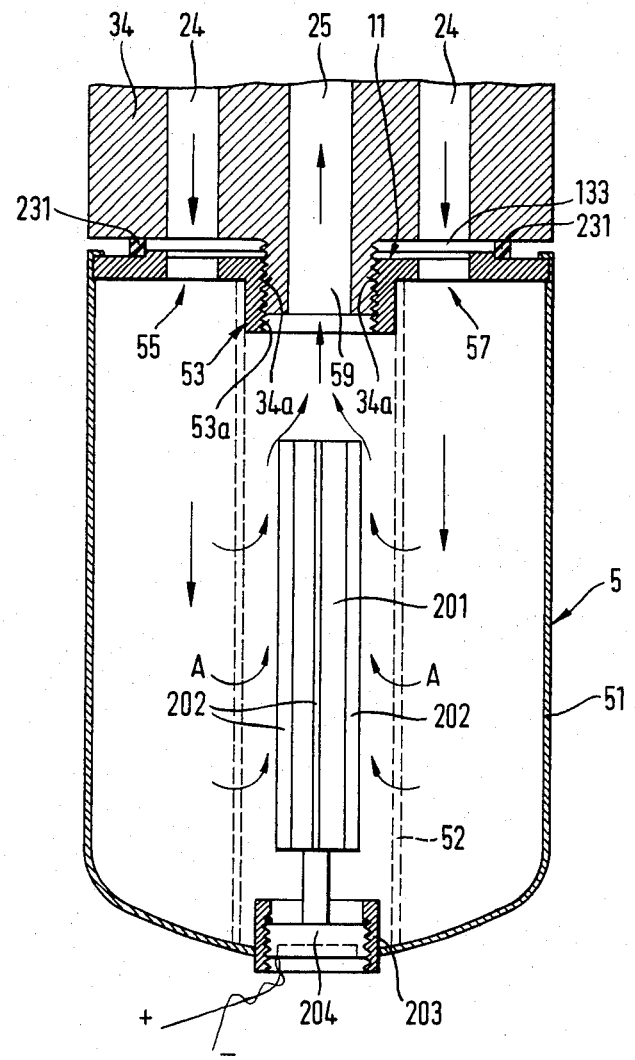
FIG. 7 shows diagrammatically as a partial longitudinal view an oil filter which has according to another embodyment of the invention been equipped with an electrical resistor inside the oil filter.

In the embodyment of FIG. 7 the oil filter 5 is equipped with a connector 203 having female threads. The tubular heating resistor comprises a connector 204 having male thread. So the heating element 201 can be screwed into its position inside the oil filter.

The layer of oil between the heating element and the surface of the filter and/or the filter cartridge in FIG. 7 functions in a manner corresponding to that of the insulation 37 described above. In such a case it is, deviating from solutions shown before, advantageous to use one or more electrical resistors, the total output of which is in the range of 50–200 W. The resistor or resistors can, because of their relatively considerable output, be connected to the battery only 15–30 minutes before the starting. The connecting can be done either with a timing device or manually with a separate switch. The thermostate is necessary also in this case in order to prevent overheating. A normal battery in good condition will well tolerate a short heavy loading of this kind.

The intermediate piece can also be made a shape different from what has been shown above. The essential is that when an intermediate piece is used, it can be connected to those connecting pipes in the lubrication circuit of the engine which are meant for the oil filter, and, on the other hand, that the desired oil filter, in turn, can be connected to the intermediate piece. This embodyment of the invention is close to the solution shown with the broken line in FIG. 2, with the difference that the separate device is replaced by an intermediate piece equipped with flow-through channels. The corresponding remarks on the possibilities for the connecting of the intermediate piece are valid of the separate device 7 also.

The invention has been described above by referring to its many advantageous embodyments. It is obvious that the invention can be modified in many ways without deviating form the basic inventive concept which will be itemized in the patent claims appended.

We claim:

1. A device for improving the cold starting of an internal combustion engine having an engine lubricating oil system including an oil reservoir, a main engine oil duct and an oil filter interposed between said oil reservoir and main engine oil duct comprising means defining a chamber, said chamber means having an inlet and an outlet, said chamber being connected in said lubricating oil system whereby said inlet is connected for receiving oil from said reservoir and said outlet connected in communication with said engine oil duct, a heating element disposed in said chamber in heat transfer relationship to the oil flowing therethrough, said chamber means being interposed directly between said main oil engine duct and said oil filter and including flow guide means interposed in said chamber for directing the flow of oil therethrough from said inlet to said outlet, said flow guide means comprises a baffle plate disposed normal to said inlet and outlet, an end wall connected to and circumscribing said baffle plate, and said heating element being connected to said end wall in heat transfer relationship to the oil flow defined by said baffle plate, a battery, and an electrical circuit connecting said heating element to said battery, said circuit comprising switch means interposed between said heating element and said battery, whereby said heating element can be energized and de-energized, depending on the position of said switch, and a thermostatic control disposed in said circuit for controlling the temperature of the oil being heated in said chamber.

2. A device as defined in claim 1 wherein said baffle plate includes a plurality of small orifices extending therethrough.

3. A device as defined in claim 1 and including a plurality of oil passageways extending through said chamber for directing lubricating oil from the reservoir to said inlet.

4. A device for improving the cold starting of an internal combustion engine having an oil reservoir (2) for containing a supply of lubricating oil, a main oil duct (6) for supplying the oil to selected locations in the engine, pump means (4) associated with the main oil duct for pumping oil from the reservoir to the main oil duct, and connecting pipe means (34) connected between the oil reservoir and the main oil duct, the connecting pipe means having at least one inlet conduit (24) for supplying oil and an outlet conduit (25) for receiving oil, the inlet and outlet conduits being of the type for accepting a closed ended oil filter (5) with threads for engaging threads of the outlet conduit and a seal for sealing around the at least one inlet conduit so that the filter can receive, filter and discharge oil, the device (7) comprising:
  a cylindrical jacket (8) defining a space;
  a pair of spaced apart flanges (91, 92) connected to said cylindrical jacket and closing said space, one of said flanges (91) being threadably engageable with the outlet conduit (25) and sealable around the at least one inlet conduit (24), the other flange (92) including thread means for threadably receiving an outlet of the filter and seal means for sealing engagement with the filter, said one flange (91) including a central opening for discharging oil from said space and the other flange (92) including a central opening for receiving oil from the filter;
  at least one further conduit (131) connected between said flange (91, 92) for defining a passage through said space for supplying oil from the at least one inlet conduit (24) to the filter (5), said further conduit being spaced radially away from said central openings in said flanges;
  a disc shaped plate (141) extending in said space parallel to said flanges (91, 92) and spaced away from each of said flanges, said plate having at least one opening therethrough through which said further conduit (131) extends;

an annular rim (142) connects to said plate (141) and extending axially toward said one flange (91), said plate and annular disc forming an upwardly open chamber (10) facing and extending radially outwardly of said opening of said one flange (91) and the outlet conduit (25) so that oil from said opening of said other flange (92) travels around a bottom of said plate (141) around sides of said rim (142) and over the upward opening of said chamber (10) into said central opening of said one flange (91);

at least one tubular part (20) extending around and in close heat transfer connection to said rim (142); and a heating resistor (18) in said at least one tubular part (20) connectable to a battery for heating said rim and plate, for heating oil in said chamber (10) so that upon starting the engine heated oil is first supplied to the outlet conduit (25).

5. A device according to claim 4, wherein said one flange (91) includes a female thread around said central opening thereof for receiving a male thread of said connecting pipe means (34), said other flange (92) including a male thread around said opening thereof for threadably engaging a female thread of a filter (5).

6. A device according to claim 5, wherein the engine includes a battery (30), said device including a manually operable switch (31) connected to said battery for manually supplying power and a thermocouple (32) connected between said switch (31) and said heating resistor (18), said thermocouple including a temperature sensor (31) connected in said chamber (10) for permitting passage of electrical power to said heating resistor before a selected temperature has been reached for oil in said chamber (10).

7. A device for effecting improved cold starting of an internal combustion engine which works in conjunction with an engine's lubricating oil system comprising an annular jacket having a pair of open ends; a flange having a plurality of holes therein attached to one of said pair of open ends; a second flange having a plurality of holes therein attached to the other end of said pair of open ends; a fastening means connected to said flange so that said annular jacket can be mounted to a standard oil filter mount on an internal combustion engine; a second fastening means connected to said second flange so that said annular jacket can be mounted to a standard oil filter used on an internal combustion engine; a plurality of intermediate ducts attached perpendicular to said first and said second flange extending from said holes in said flange and second flange enclosed by said annular jacket; a flow guide within said annular jacket having a circular disc mounted parallel to said first and said second flange and an annular rim mounted perpendicular to said circular disc, said dict having a plurality of orifices disposed therein; a heating element attached to said annular rim having an electrical resistor within and a tubular part; a conductor electrically connected to said heating element, said conductor extending through said device and connected to a current source.

* * * * *